(12) United States Patent
Yukawa (10) Patent No.: US 8,794,281 B2
(45) Date of Patent: Aug. 5, 2014

(54) PNEUMATIC TIRE SET

(75) Inventor: Naoki Yukawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 57 days.

(21) Appl. No.: 13/428,537

(22) Filed: Mar. 23, 2012

(65) Prior Publication Data

US 2012/0175032 A1     Jul. 12, 2012

Related U.S. Application Data

(62) Division of application No. 12/226,145, filed as application No. PCT/JP2007/059300 on May 1, 2007.

(30) Foreign Application Priority Data

May 9, 2006    (JP) .................................. 2006-130568
Apr. 12, 2007   (JP) .................................. 2007-105068

(51) Int. Cl.
    *B60C 5/00*      (2006.01)
    *B60C 19/00*     (2006.01)
(52) U.S. Cl.
    CPC .................................. *B60C 19/002* (2013.04)
    USPC ............................................................. 152/450
(58) Field of Classification Search
    USPC ..................................................... 152/450, 157
    See application file for complete search history.

(56) References Cited

U.S. PATENT DOCUMENTS

| 2005/0155686 A1 | 7/2005 | Yukawa et al. |
| 2005/0275277 A1* | 12/2005 | Yukawa |
| 2006/0157180 A1 | 7/2006 | Tanno et al. |
| 2006/0272759 A1 | 12/2006 | Yukawa |

FOREIGN PATENT DOCUMENTS

| JP | 01078902 | * | 3/1989 |
| JP | 2003-63208 A | | 3/2003 |
| JP | 2003/226104 A | | 8/2003 |
| JP | 2006/335199 A | | 12/2006 |
| WO | WO 03/103989 A1 | | 12/2003 |
| WO | WO 2005/012005 A1 | | 2/2005 |

OTHER PUBLICATIONS

English translation of Japanese Patent Application 1-78902 A, Mar. 24, 1989.*

* cited by examiner

*Primary Examiner* — Adrienne C Johnstone
(74) *Attorney, Agent, or Firm* — Birch, Stewart, Kolasch & Birch, LLP (57) ABSTRACT

On a tire inner surface "is" facing a tire cavity "i" surrounded by a rim 2 and a pneumatic tire 3, the tire is provided with a noise damper 4 made of a spongy material and extending in the circumferential direction of the tire. Noise dampers 4 having the same cross sectional shape are used in a size group of tires which include a minimum volume tire that the cross sectional area S of the tire cavity on the meridian cross section has a minimum value Smin and a maximum volume tire that the cavity cross section area S has a maximum value Smax, and which have sizes such that the cavity sectional area ratio Smax/Smin falls within the range of 1.00 to 1.95.

4 Claims, 7 Drawing Sheets

(Section Shape A)

FIG.6(B)

(Section Shape B)

FIG.6(C)

(Section Shape C)

FIG.7(A)

(Section Shape D)

FIG.7(B)

(Section Shape E)

FIG.8

PNEUMATIC TIRE SET

CROSS REFERENCE TO RELATED APPLICATIONS

This application is a Divisional of co-pending application Ser. No. 12/226,145 filed on Oct. 9, 2008 and for which priority is claimed under 35 U.S.C. §120. application Ser. No. 12/226,145 is the national phase of PCT International Application No. PCT/JP2007/059300 filed on May 1, 2007 under 35 U.S.C. §371. Priority is also claimed to Japanese Application No. 2006-130568 filed on May 9, 2006 and Japanese Application No. 2007-105068 filed on Apr. 12, 2007. The entire contents of each of the above-identified applications are hereby incorporated by reference.

TECHNICAL FIELD

The present invention relates to a pneumatic tire set capable of efficiently producing pneumatic tires with a noise damper without impairing the noise suppression performance, in which a spongy material for noise suppression is fixed onto an inner surface of a tire.

BACKGROUND ART

As one of tire noises is known a so-called road noise which sounds like "GHO" within a frequency range of 50 to 400 Hz when running on a road. A main cause of the road noise is considered a resonance vibration of air (cavity resonance) which generates in the tire cavity. In recent years, a technology is proposed in which a noise damper which is made of a spongy material and extends circumferentially is fixed onto an inner surface of a tire to ease and absorb a resonance energy generated in the tire cavity, thereby suppressing the cavity resonance to reduce a road noise (see for example Patent Literature 1).
Patent Literature 1: JP-A-2003-63208

According to Patent Literature 1, the noise suppression performance has a strong correlation with a volume ratio V2/V1 of a volume V2 of the noise damper to a whole volume V1 of the tire cavity. It is disclosed that the noise suppression performance can be obtained by securing a certain value or more of the volume ratio V2/V1, and the circumferential length, width, thickness and so on of the noise damper are not particularly limited from the viewpoint of the noise suppression performance. However, if the noise damper is formed on a part of a tire in the circumferential direction, there arises a problem that the weight balance in the circumferential direction is impaired to cause deterioration of the tire uniformity even though the specific gravity of the spongy material is low.

Therefore, from the viewpoint of the uniformity, it is important to fix the noise damper over an approximately entire length of the tire in the circumferential direction. For this purpose, it is required to set the circumferential length of the noise damper depending on a tire size based on the circumferential length of the tire. In order to reduce a material cost by minimizing the use of a spongy material on the premise that the noise damper is fixed over approximately entire circumferential length of the tire, it is also required to set the sectional shape (sectional area) of the noise damper in detail depending on the tire size based on the sectional area of the tire cavity.

DISCLOSURE OF INVENTION

Problem to be Solved by the Invention

However, this brings about marked increase in types or kinds of the noise damper, resulting in deterioration of production efficiency, management efficiency, transportation, storage efficiency and the like in the production of tires.

Accordingly, it is an object of the present invention to provide a pneumatic tire set capable of significantly reducing the kinds of noise damper, while securing a high noise suppression performance and a high uniformity of tire, to achieve improvement of production efficiency, management efficiency, transportation, storage efficiency and the like and reduction of total cost.

Means to Solve the Invention

In order to achieve the above-mentioned object, one aspect of the invention is characterized in that a pneumatic tire to be attached to a rim is provided with a noise damper made of a spongy material which is fixed to a tire inner surface facing a tire cavity surrounded by the rim and the pneumatic tire and which extends in the circumferential direction of the tire, and that noise dampers having the same cross sectional shape are used in a size group of pneumatic tires which include a minimum volume tire that the cross sectional area S of the tire cavity on the meridian cross section including a tire shaft has a minimum value Smin and a maximum volume tire that the cross section area S has a maximum value Smax, and which have sizes such that the cavity sectional area ratio Smax/Smin falls within the range of 1.00 to 1.95.

In one embodiment of the invention, the noise dampers have a volume V2 of 0.4 to 20% of a whole volume V1 of the tire cavity.

In accordance with the present invention, the noise dampers may be fixed to the inner surface of the tires along the tire equator in the circumferential direction, and the spacing between the circumferential both ends of each noise damper is at most 80 mm.

When the noise dampers having the same cross sectional shape are used in a size group of pneumatic tires, the size group may include a circumferential length group of tires in which the difference in circumferential length of the inner surface of the tires on the tire equator is at most 80 mm, and noise dampers having the same circumferential length are used in this circumferential length group of tires.

One aspect of the invention is characterized in that the noise dampers have a width obtained by dividing a standard width by "n" (n=3 to 40).

In one embodiment of the invention, noise dampers having the same cross sectional shape and the same circumferential length are used in at least two of tires belonging to any one of the following size groups (a) to (w):
(a) 225/60R16, 225/55R17
(b) 215/60R16, 215/55R17
(c) 215/45R18, 235/35R19, 215/50R17
(d) 225/40R18, 205/50R17, 215/35R19, 225/35R19, 225/50R16
(e) 215/40R18, 215/45R17
(f) 225/35R18, 205/45R17
(g) 195/40R17, 205/40R17
(h) 245/40R20, 245/45R19
(i) 255/45R18, 235/50R18
(j) 245/35R20, 255/35R20
(k) 285/30R20, 275/35R19, 275/40R18, 245/45R18
(l) 275/30R20, 235/50R17, 245/40R19
(m) 225/45R18, 225/50R17, 235/45R18
(n) 245/35R19, 245/40R18, 245/45R17
(o) 235/40R18, 235/45R17, 275/30R19, 265/35R18, 275/35R18, 265/40R17
(p) 225/45R17, 265/30R19, 255/35R18, 255/40R17
(q) 235/40R17, 245/40R17

(r) 195/45R16, 185/55R15, 205/50R15
(s) 195/60R14, 195/55R15, 205/45R16
(t) 195/60R15, 195/55R16
(u) 205/60R15, 205/55R16
(v) 165/45R16, 165/50R15
(w) 165/60R14, 165/55R15.

In the specification, the term "same cross sectional shape" means that the cross sections are substantially the same in shape and size. Further, the "volume V2" of the noise damper is an apparent whole volume of the noise damper, and denotes a volume defined by the profile of the noise damper including cells inside the noise damper. The "whole volume V1 of the tire cavity" is approximately obtained according to the following equation with respect to a pneumatic tire in a normal state that a normal internal pressure and no load are applied to the pneumatic tire attached to a normal rim:

$$V1 = A \times \{(Di-Dr)/2 + Dr\} \times \pi$$

wherein "A" is the cross sectional area of a tire cavity "i" obtained by CT scanning of the tire-rim assembly in the normal state, "Di" is the maximum outer diameter of a cavity-facing surface "is" of the tire in the normal state, "Dr" is the diameter of the rim, and "π" is the ratio of the circumference of a circle to its diameter.

The "normal rim" denotes a rim defined for every tire in a standardizing system on which the tire is based and is, for example, the "standard rim" in JATMA, the "Design Rim" in TRA and the "Measuring Rim" in ETRTO. The "normal internal pressure" denotes an air pressure defined for every tire in a standardizing system on which the tire is based and is, for example, the maximum air pressure in JATMA, the maximum value recited in the table of "Tire Load Limits at Various Cold Inflation Pressures" in TRA, and the "Inflation Pressure" in ETRTO, provided that in case of tires for passenger cars, the "normal internal pressure" is defined as 200 kPa in consideration of actual frequency of use.

Effects of the Invention

In the present invention, while tires having various sizes are grouped into specific size groups based on the magnitude of the cavity sectional area S, noise dampers having the same cross sectional shape are commonly used in tires of a size group. Of tires belonging to the size group, a minimum volume tire having a minimum cavity cross sectional area Smin and a maximum volume tire having a maximum cavity cross section area Smax satisfy a sectional area ratio Smax/Smin within the range of 1.00 to 1.95.

On the premise that a noise damper is fixed over approximately entire circumferential length of a tire, within the above range can be obtained a noise damper having a common cross sectional shape enabling all tires belonging to a size group to exhibit an excellent noise suppression performance without exerting such a bad influence that the sectional area of the noise damper becomes too large and heat accumulation occurs to deteriorate the durability thereof owing to temperature rise. In other words, it is possible to make the cross sectional shape of noise dampers common in a size group with exhibiting an excellent noise suppression performance without impairing the durability. Thus, in the production of pneumatic tires with a noise damper, the production efficiency, management efficiency, transportation, storage efficiency and the like can be enhanced.

EXPLANATION OF SYMBOLS

2: Rim
3: Pneumatic tire
4: Noise damper
4e: Circumferential both ends of a noise damper
i: Tire cavity
is: Inner surface of tire
g: Spacing
WO: Standard width

BEST MODE FOR CARRYING OUT THE INVENTION

An embodiment of the present invention will now be explained with reference to the accompanying drawings.

Figure 1:
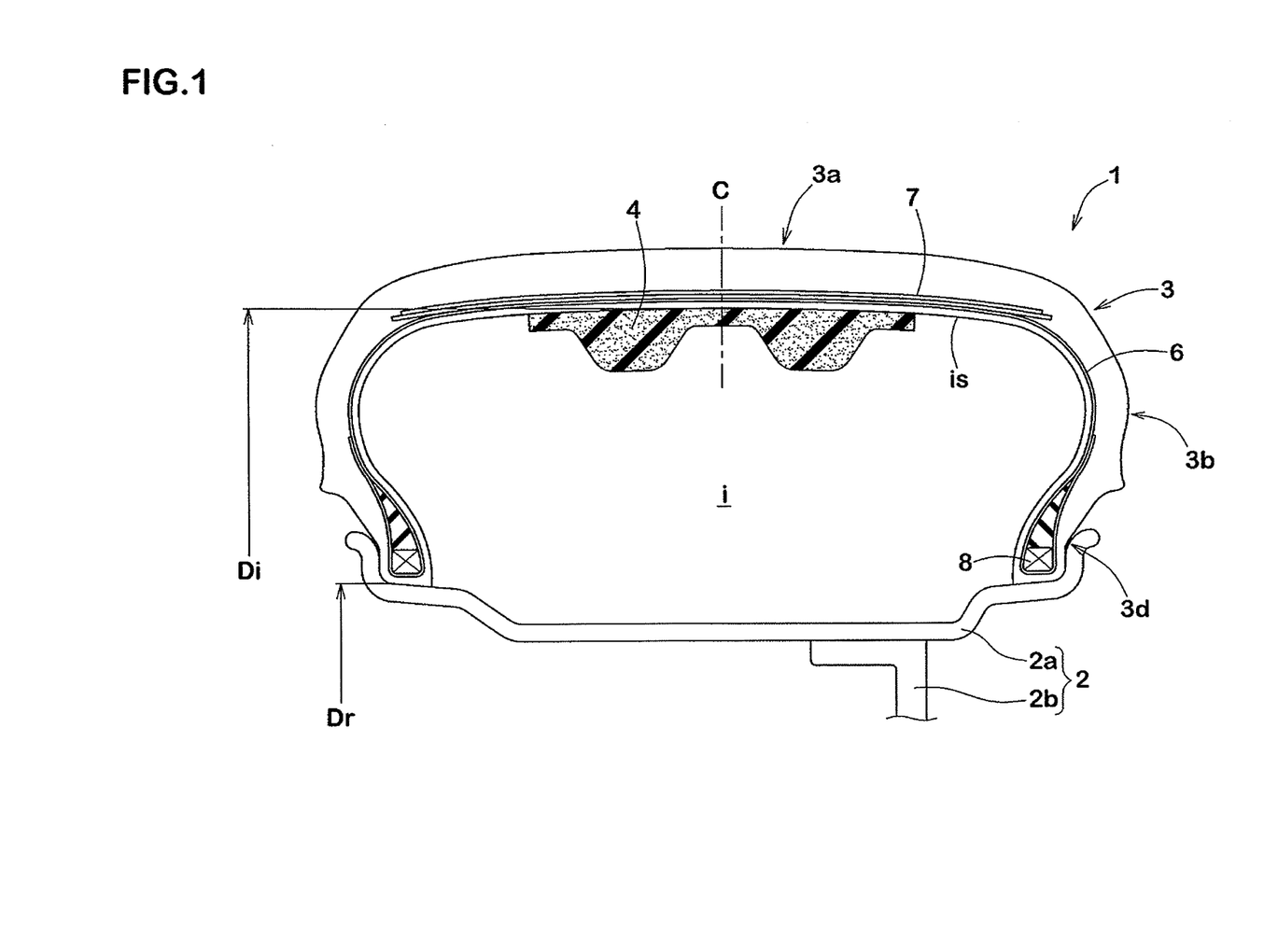
FIG. 1 is a cross sectional view showing an example of a tire-rim assembly belonging to a pneumatic tire set according to the present invention.

In FIG. 1, a noise damper-equipped pneumatic tire 1 comprises a tire 3 to be attached to a rim 2, and a noise damper 4 which is fixed to a tire inner surface "is" facing a tire cavity "i" surrounded by the rim 2 and the tire 3 and which extends in the circumferential direction of the tire with keeping an approximately constant sectional shape.

The rim 2 has a known structure including an annular rim body 2a on which bead portions 3b of the tire 3 are mounted, and a disk 2b for fixing the rim body 2a to an axle. In this embodiment is shown a case where a normal rim prescribed in the standards mentioned above such as JATMA is used.

The above tire 3 is a tubeless tire and includes a tread portion 3a, a pair of sidewall portions 3b radially inwardly extending from both edges of the tread portion 3a, and bead portions 3d disposed at radially inner edges of the sidewall portions 3b. A cavity-facing inner surface "is" of the tire is covered with an inner liner made of a low air permeable rubber. As a tire 3 can be used various tires without being restricted by inside structure and category. However, suitably adopted are passenger car tires which are strongly demanded to be quiet in a car, particularly radial tires for passenger cars having an aspect ratio of 60% or less.

The tire 3 is reinforced by a carcass 6 extending between the bead portions 3d, 3d, and a cord layer including a belt layer 7 disposed inside the tread portion 3a and radially outward of the carcass 6. The carcass 6 comprises at least one carcass ply in which, for example, organic fiber cords are arranged at an angle of, for example, 70 to 90° with respect to the tire circumferential direction. In this embodiment, the carcass 6 is formed of a single carcass ply. Both end portions of the carcass ply are turned up around bead cores 8. The belt layer 7 is formed of a plurality of belt plies, two belt plies in this embodiment, in which, for example, steel cords are arranged at an angle of, for example, 10 to 40° with respect to the tire circumferential direction. The belt layer 7 is disposed so that the steel cords in one belt ply cross the steel cords in the other belt ply, whereby the belt rigidity is enhanced. A known band layer or the like may be disposed outward of the belt layer 7, as occasion demands.

The noise damper 4 comprises a ribbon- or belt-like spongy material which is long in the tire circumferential direction, and it is fixed to the inner surface "is" of a tire along the tire equator C in the circumferential direction. The spongy material is a sponge-like porous material and encompasses, besides so-called sponges having open cells obtained by expanding rubbers, synthetic resins or the like, web-like materials in which an animal fiber, a vegetable fiber, a synthetic fiber or the like are intertwined to form an integral body. The term "porous material" encompasses not only those having open cells but also those having closed cells. In this embodiment, an open cell type sponge material made of a polyurethane is used as the noise damper 4. The spongy materials as mentioned above lower the volume of sound (cavity resonance energy) in the tire cavity "i" to reduce a road noise, since a porous portion in the surface of and/or inside the material converts a vibration energy of air into heat energy to consume it. Since the spongy material easily undergoes deformation such as shrinking or bending, it only exerts a small influence on deformation of a tire at the time of running. Therefore, the spongy material will not deteriorate the steering stability.

As the spongy material are preferably used those having a specific gravity of 0.005 to 0.060. If the specific gravity is outside this range, the effect of suppressing the cavity resonance energy tends to lower in terms of porosity and the like. Further, it is preferable that the spongy material has a hardness of 80 to 150 N and a tensile strength of 120 to 160 kPa. An appropriate elongation is secured by limiting the hardness to the above range. The elongation helps to widely disperse a stress when a strain acts on the noise damper 4. It is particularly preferable that the hardness is at least 90 N, and is at most 130 N, especially at most 110 N. On the other hand, the strength against the above-mentioned stress is further enhanced by limiting the tensile strength of the spongy material. It is particularly preferable that the tensile strength of the spongy material is at least 130 kPa. The upper limit thereof is not particularly limited, but a tensile strength of at most 150 kPa is preferred from the viewpoints of cost, productivity, availability on the market, and the like.

The above-mentioned hardness of the spongy material denotes a value measured according to a method A (paragraph 6.3) among methods for measuring hardness in paragraph 6 prescribed in JIS K6400 "Testing Methods for Flexible Urethane Foam". Further, the tensile strength of the spongy material denotes a value measured for No. 1 dumbbell specimens according to "tensile strength and elongation" prescribed in paragraph 10 of JIS K6400.

Preferable examples of the spongy material are a sponge of a synthetic resin such as an ether-based polyurethane sponge, an ester-based polyurethane sponge or a polyethylene sponge, a sponge of a rubber such as a chloroprene rubber sponge (CR sponge), an ethylene-propylene rubber sponge (EPDM sponge) or a nitrile rubber sponge (NBR sponge), and the like. Polyurethane sponges including ether-based polyurethane sponges are particularly preferred from the viewpoints of noise reduction property, light weight, controllability of foaming and durability. Since polyurethane sponges have a problem of discoloration in long term use, non-white sponges, particularly gray-colored sponges, are preferred. When a tire is charged with a high pressure air, moisture included in the air may enter into the tire cavity "i". In this respect, too, ether-based polyurethane sponges which are resistant to hydrolysis are preferred as the spongy material. Also, in order to prevent water from soaking into the spongy material when it gets wet, it is preferable to include a water repellent agent into the spongy material or to coat a water repellent agent onto the surface of the spongy material. Further, in order to prevent generation of mold owing to moisture, it is also preferable to include an antifungal agent into the spongy material or to coat an antifungal agent onto the surface of the spongy material. Further, in order to lower the toxicity of waste gases generated when waste tires are incinerated, it is particularly preferable to form a spongy material from a material containing no halogen atom.

It is preferable that the noise damper 4 has a volume V2 of 0.4 to 20% of the whole volume V1 of the tire cavity "i". The reason is that, as disclosed in the above-mentioned Patent Literature 1, the volume ratio V2/V1 has a strong correlation with the noise suppression performance, and the noise suppression performance is exhibited when the ratio V2/V1 is 0.4% or more, but the weight and the cost unnecessarily increase or the noise damper tends to exert a bad influence on running performance, if the ratio V2/V1 exceeds 20%. On the other hand, it is disclosed that the circumferential length L2, width W2 and thickness T2 of the noise damper 4 do not have a strong correlation with the noise suppression performance and are not particularly limited. However, in the case that the length L2 of the noise damper 4 in the tire circumferential direction is too small and accordingly the spacing "g" (shown in FIG. 2) between circumferential both ends 4e of the noise damper 4 is large, a circumferential weight balance is impaired to bring about deterioration of tire uniformity.

Figure 2:
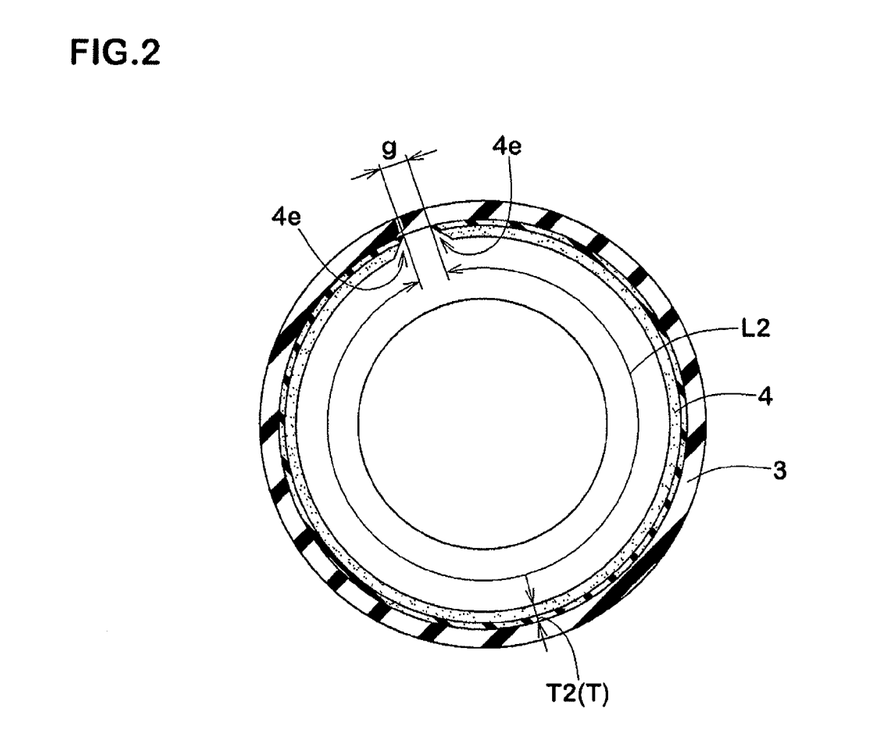
FIG. 2 is a circumferential section view of a pneumatic tire.

Therefore, from the viewpoint of tire uniformity, it is important to fix the noise damper 4 over an approximately entire length of the tire 3 in the circumferential direction. As a result of present inventor's investigation, it has been found that when the spacing "g" between the circumferential both ends 4e of the noise damper 4 is as short as 80 mm or less, the tire uniformity can be retained while scarcely affecting the weight balance. The circumferential length Lc along the tire equator C of the inner surface "is" of tires for passenger cars is within the range of about 1,700 to about 2,200 mm and, therefore, the upper limit value 80 mm of the spacing "g" is not more than 5.0% of the tire circumferential length Lc and is almost negligible. Therefore, in the case that the noise damper 4 is fixed over an approximately entire circumferential length under the condition of g 80 mm, it is possible to use the ratio S2/S of the cross sectional area S2 of the noise damper 4 to the cross sectional area S of the tire cavity "i" instead of the above-mentioned volume ratio V2/V1.

Practical test 1 mentioned after was made with respect to this S2/S ratio. As a result, as shown in Table 2 and FIG. 8, it was confirmed that an effect of noise reduction of 4 dB or more that a driver is strongly sensible of reduction of cavity resonance is obtained when the S2/S ratio is within a range of 5.7% or more, although the effect varies to some extent depending on the cross sectional shape of noise damper 4, the tire size, the type of vehicle and the like. If the S2/S ratio exceeds 8.0%, the noise reduction effect reaches a plateau and no further reduction is expected. Furthermore, if the S2/S ratio is too large, heat accumulation of noise damper 4 increases to cause a problem that the durability of noise damper itself and the durability of a tire will deteriorate owing to temperature rise. However, from the results of practical test 2 (mentioned after) shown in Table 3, it was confirmed that at least when the S2/S ratio is within a range up to 11.1%, there is no bad influence on the durability. Therefore, from the viewpoints of the noise suppression effect and the durability, it is preferable that the S2/S ratio is within the range of 5.7 to 11.1%. Therefore, Smax/Smin ratios up to 11.1/5.7=about 1.95 are theoretically adoptable.

Thus, the feature of the present invention resides in that noise dampers 4 having the same cross sectional shape are commonly used for a size group of tires which include a minimum volume tire having a minimum cavity sectional area Smin and a maximum volume tire having a maximum cavity sectional area Smax and which have sizes such that the cavity sectional area ratio Smax/Smin falls within the range of 1.00 to 1.95. In other words, tires of various sizes used for the production of pneumatic tires 1 with noise damper are classified into specific size groups based on the magnitude of the cavity sectional area, and noise dampers 4 having the same sectional shape are commonly used in tires belonging to a specific size group.

In a size group, the ratio Smax/Smin of the cavity cross section area Smax of a maximum volume tire belonging to that size group to the cavity cross sectional area Smin of a minimum volume tire belonging to that size group is from 1.00 to 1.95. Within this range, for example, a noise damper 4 the S2/Smax ratio of which is 5.7% for the maximum volume tire, shows a S2/Smin ratio of 11.1% for the minimum volume tire. That is to say, there can be obtained noise dampers 4 having a common cross sectional area S2 (common cross sectional shape) capable of exhibiting an excellent noise suppression performance in all tires belonging to that size group without deteriorating the durability.

In particular, when a size group includes a circumferential length group of tires in which the difference in the circumferential length Lc of the tires is 80 mm or less, it is also possible to use noise dampers 4 having the same circumferential length L2 in the tires of this circumferential length group. In that case, the spacing "g" between the circumferential both ends 4e of the noise dampers 4 can be maintained within the range of not more than 80 mm.

Figure 3:
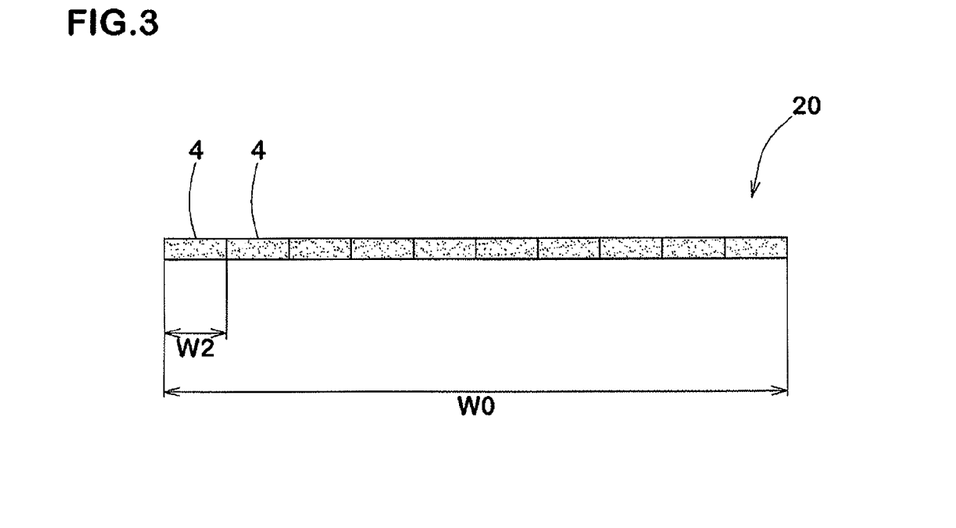
FIG. 3 is a view showing an example of a method for forming a noise damper.

Like this, in the present invention, tires are classified into size groups in each of which the Smax/Smin ratio falls within the range of 1.00 to 1.95, whereby it is possible to commonly use noise dampers having the same cross sectional shape in respective tires belonging to each of the size groups. As a result, it is possible to obtain a total cost reduction effect which exceeds an advantage of reduction in amount of spongy material which is produced when the cross sectional shape of a noise damper 4 is carefully set according to the cavity sectional area S of tires. That is to say, it is possible to make common an intermediate material used when producing the noise dampers, whereby there can be achieved improvement of production efficiency, management efficiency, transportation, storage efficiency and the like and reduction of total cost thereby. In particular, complete common use of noise dampers in which the circumferential length L2 is also made identical can be achieved for tires of a circumferential length group and accordingly, in that case, a higher effect can be obtained. Noise dampers 4 having a different cross sectional shape are used in a different size group. Preferably, from the viewpoints of cost and working efficiency, the noise dampers 4 having a predetermined width, i.e. a predetermined cross sectional area S2, are prepared by dividing a wide standard material 20 having a standard width WO, as shown in FIG. 3, into "n" equal parts. In case of changing the cross sectional area S2 of the noise dampers 4 to apply them to a different size group, it can be achieved by changing the number of partitions "n" of the standard material 20. For example, a standard material 20 having a width WO of 970 mm is divided into 10 equal parts to give noise dampers 4 having a width W2 of 97 mm, or into 9 equal parts to give noise dampers 4 having a width W2 of 107.8 mm. Thus, complete common use of the standard material 20 can be achieved. The number of partitions "n" is generally from 3 to 40 under consideration of tire size, preferably 5 to 20, more preferably 8 to 13.

Figure 4:
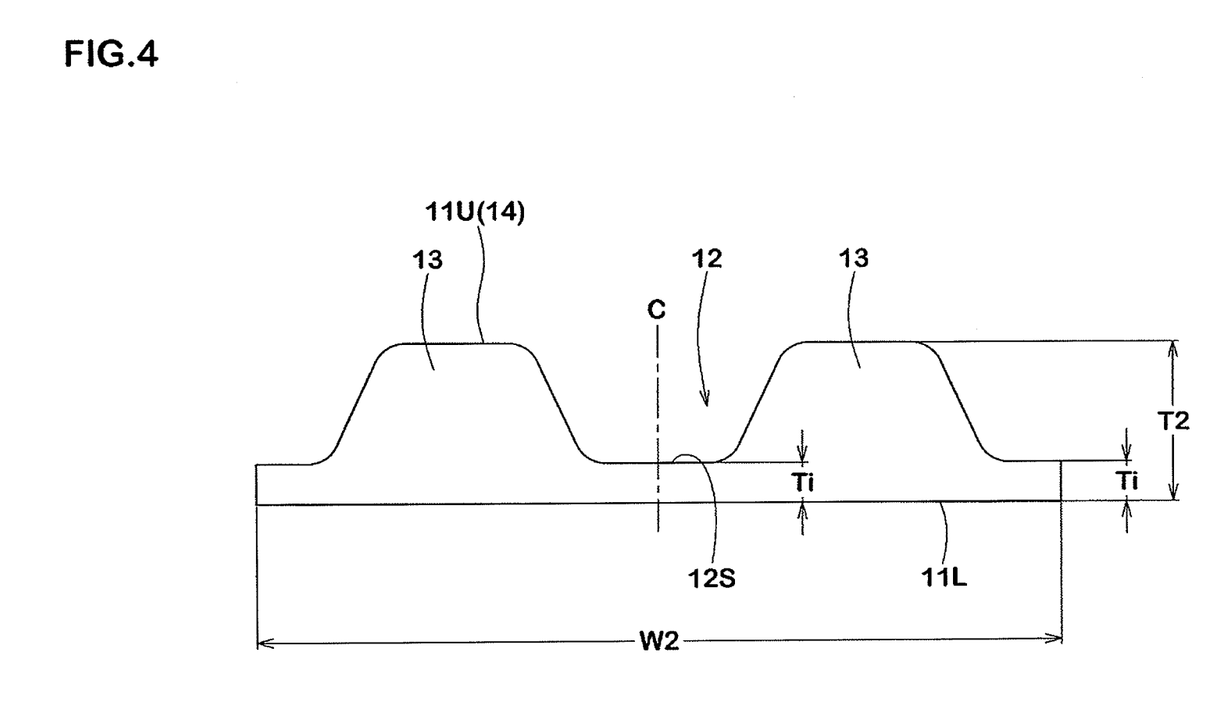
FIG. 4 is an enlarged cross sectional view showing a cross sectional shape of a noise damper.

As the cross sectional shape of the noise damper 4 is preferred a bimodal or twin peaks-type sectional shape which has, as shown in FIG. 4, a fixing surface 11L to be fixed onto the tire inner surface "is" and a top surface 11U which will face the tire cavity, and which is further provided, on the top surface 11U, with a heat releasing recess portion 12 which opens toward the tire cavity and extends circumferentially on the tire equator C, and peak portions 13, 13 which are disposed on the axially both edges of the heat releasing recess portion 12 and extend circumferentially with rising up toward the tire cavity side to a level higher than a groove bottom 12S of the heat releasing recess portion 12.

Such a noise damper 4 has an enhanced heat releasing effect by increase in surface area based on formation of the heat releasing recess portion 12 and by partition of a heat accumulating thick portion into right and left portions and, therefore, it can effectively suppress heat accumulation of the noise damper 4. It is preferable that the maximum value T2 of the thickness T at the peak portion 13 measured from the fixing surface 11L is from 20 to 50 mm, and the noise damper has a flat shape such that the width W2 of the fixing surface 11L in the axial direction of tire is larger than the maximum value T2 of the thickness, whereby the posture of the noise damper 4 after adhesion is stabilized to prevent the noise damper 4 from falling down or peeling off is during running. It is preferable that the thickness Ti of the groove bottom 12S of the heat releasing portion 12 from the fixing surface 11L is at least 1.0 mm and is at most 50% of the maximum thickness T2. If the thickness Ti is less than 1.0 mm, the strength is insufficient, and if it is more than 50% of the thickness T2, the heat releasing effect is remarkably decreased and heat accumulation cannot be sufficiently suppressed.

In the present embodiment, the upper surface 11U extends along a wavy curve 14 in which peaks and valleys are alternately repeated in two pitches, whereby the efficiency of production of noise damper 4 is enhanced. Although a trapezoidal wave composed of straight lines is preferable as the wavy curve 14 from the viewpoint of the production efficiency, the wavy curve 14 may be for example a sine wave curve.

Figure 5A:
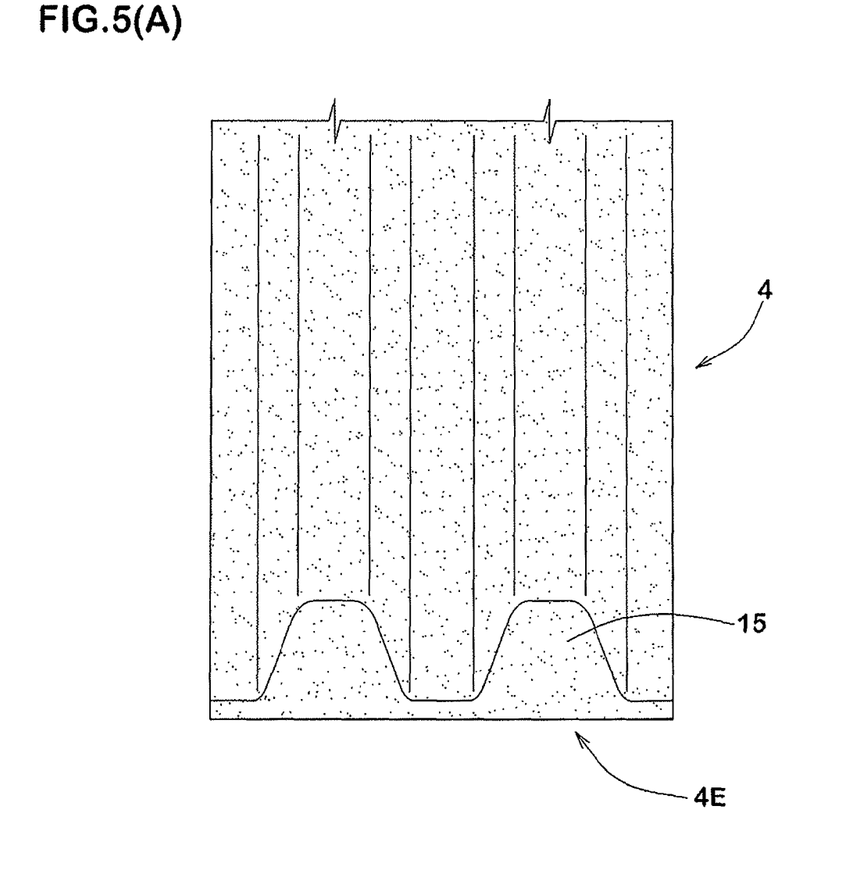
FIG. 5(A) is a plan view of a noise damper.
Figure 5B:
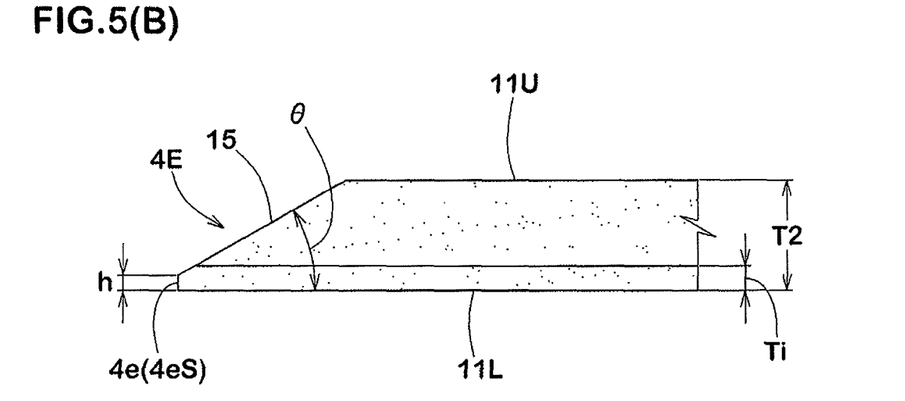
FIG. 5(B) is a side view thereof.

As shown in FIGS. 5(A) and 5(B), both end portions 4E in the tire circumferential direction of the noise damper 4 are tapered to give tapered portions 15 at which the thickness gradually decreases toward the circumferential end 4e. The tapered portions 15 are formed so that an angle θ sandwiched between the fixing surface 11L and the upper surface 11U is an acute angle. Since the tapered portions 15 relatively decrease the mass of the circumferential both end portions 4E of the noise damper 4 as compared with other portions thereof, stress concentration at an adhesion face of the both end portions 4E of the noise damper 4 can be decreased. In order to enhance such an effect, it is preferable that the angle θ of the tapered portions 15 of the noise damper 4 is from 15 to 70°. It is also preferable that the tapered portions 15 have an end face 4 eS formed by cutting an end portion at an approximately right angle with respect to the fixing surface 11L. The end faces 4 eS enhance the strength of the both ends 4e of the noise damper 4 and accordingly, for example, they can effectively prevent generation of damages such as tearing or cracking at the time of transportation or storage. Further, such end faces 4 eS enhance the adhesion property to the tire inner surface "is". Although the height "h" of the end face 4 eS is not particularly limited, it is preferably at least 3 mm, more preferably at least 4 mm, and is preferably at most 30% of the thickness T2.

As a method of fixing the noise damper 4 is preferred, for example, adhesion by an adhesive and/or a pressure sensitive adhesive double-coated tape or the like. Preferable examples of the adhesive are, for example, synthetic rubber-based liquid-type adhesives, e.g., a solution type adhesive in which a synthetic rubber is dissolved in an organic solvent, and a latex type adhesive in which a synthetic rubber is dispersed in water. Examples of the pressure sensitive adhesive double-coated tape are, for example, a tape prepared by forming pressure sensitive adhesive layers on both surfaces of a sheet-like base material such as a woven fabric, a tape comprising only an adhesive layer prepared without using the base material, and other various tapes. In the present embodiment is used a pressure sensitive adhesive double-coated tape. It is preferable that the double-coated tape has a tensile strength of not less than 5 to less than 10 N/10 mm. Herein, the tensile strength of the pressure sensitive adhesive double-coated tape is measured according to JIS Z0237 "Testing method for tensile strength of pressure sensitive adhesive tapes". For example, when it is desired to reuse a tire by peeling off noise damper 4 from tire 3, the double-coated adhesive tape itself is required to have a some degree of tensile strength. If the tensile strength of the double-coated adhesive tape is less than 5 N/10 mm, there is a tendency that the tape itself is broken at the time of peeling and the noise damper 4 cannot be removed from the tire inner surface "is". On the other hand, if the tensile strength is 10 N/10 mm or more, the cost increases and the use of such a tape is unsuitable for mass production.

In case of tires for passenger cars, the tires can be grouped into the following size groups (a) to (w). These size groups are also circumferential length groups that the difference in the circumferential length Lc of tires in each group is at most 80 mm. Therefore, a single kind of noise dampers 4 having the same cross sectional shape and the same circumferential length are applicable to all tires belonging to each of the size groups (a) to (w). However, it is not required to use noise dampers having the same cross sectional shape and the same circumferential length (these noise dampers being sometimes referred to as "identical noise dampers" for convenience sake) in all tires belonging to each of the size groups (a) to (w). Identical noise dampers may be used in only tires belonging to any one of the size groups (a) to (w), e.g., only tires (225/60R16, 225/55R17) belonging to the size group (a).

Further, in case that three or more tires belong to one size group, for example, five tires belong to one size group as in the size group (d), identical noise dampers may be used in at least two of these tires.

(a) 225/60R16, 225/55R17
(b) 215/60R16, 215/55R17
(c) 215/45R18, 235/35R19, 215/50R17
(d) 225/40R18, 205/50R17, 215/35R19, 225/35R19, 225/50R16
(e) 215/40R18, 215/45R17
(f) 225/35R18, 205/45R17
(g) 195/40R17, 205/40R17
(h) 245/40R20, 245/45R19
(i) 255/45R18, 235/50R18
(j) 245/35R20, 255/35R20
(k) 285/30R20, 275/35R19, 275/40R18, 245/45R18
(l) 275/30R20, 235/50R17, 245/40R19
(m) 225/45R18, 225/50R17, 235/45R18
(n) 245/35R19, 245/40R18, 245/45R17
(o) 235/40R18, 235/45R17, 275/30R19, 265/35R18, 275/35R18, 265/40R17
(p) 225/45R17, 265/30R19, 255/35R18, 255/40R17
(q) 235/40R17, 245/40R17
(r) 195/45R16, 185/55R15, 205/50R15
(s) 195/60R14, 195/55R15, 205/45R16
(t) 195/60R15, 195/55R16
(u) 205/60R15, 205/55R16
(v) 165/45R16, 165/50R15
(w) 165/60R14, 165/55R15

The above tire sizes denote, as well known, [width in section]/[aspect ratio][symbol showing tire structure][rim diameter] in that order. A symbol for speed range such as [symbol of speed] may be inserted between [aspect ratio] and [symbol showing tire structure]. Therefore, a tire called, for example, 225/40ZR18 is encompassed in a tire called 225/40R18 belonging to the size group (d).

Examples of the pneumatic tire set are shown in Table 1. Details of cross sectional shapes A, B, C, D and E of spongy materials in Table 1 are shown in FIGS. 6(A) to 6(C) and FIGS. 7(A) and 7(B). The size unit in the drawings is "mm". These tires have an area ratio S2/S within the range of 5.7 to 11.1% and can exhibit an excellent noise suppression performance with retaining the durability. The spacing "g" between the circumferential both ends 4e of noise damper 4 is 80 mm or less and, therefore, a weight balance in the circumferential direction can be secured to retain the tire uniformity.

TABLE 1

| | | Nose damper | | | Tire | | | |
|---|---|---|---|---|---|---|---|---|
| | Tire size | Cross section shape | Circumferential length L1 (mm) | Section area S2 (cm$^2$) | Cavity section area S (cm$^2$) | Circumferential length Lc (mm) | Ratio S2/S (%) | Spacing "g" (mm) |
| a | 225/55R17 | A | 1985 | 14.55 | 211 | 2000 | 6.9 | 15 |
|   | 225/55R16 | A | 1985 | 14.55 | 230 | 2005 | 6.3 | 20 |
| b | 215/60R16 | A | 1950 | 14.55 | 212 | 1980 | 6.9 | 30 |
|   | 215/55R17 | A | 1950 | 14.55 | 194 | 1975 | 7.5 | 25 |
| c | 215/45R18 | B | 1885 | 12.125 | 156 | 1915 | 7.8 | 30 |
|   | 235/35R19 | B | 1885 | 12.125 | 146 | 1910 | 8.3 | 25 |
|   | 215/50R17 | B | 1885 | 12.125 | 175 | 1900 | 6.9 | 15 |
| d | 225/40R18 | B | 1840 | 12.125 | 152 | 1860 | 8.0 | 20 |
|   | 205/50R17 | B | 1840 | 12.125 | 159 | 1872 | 7.6 | 32 |
|   | 215/35R19 | B | 1840 | 12.125 | 119 | 1860 | 10.2 | 20 |
|   | 225/35R19 | B | 1840 | 12.125 | 132 | 1870 | 9.2 | 30 |
|   | 225/50R16 | B | 1840 | 12.125 | 191 | 1852 | 6.3 | 12 |
| e | 215/40R18 | B | 1820 | 12.125 | 138 | 1840 | 8.8 | 20 |
|   | 215/45R17 | B | 1820 | 12.125 | 156 | 1835 | 7.8 | 15 |
| f | 225/35R18 | B | 1785 | 12.125 | 132 | 1800 | 9.2 | 15 |
|   | 205/45R17 | B | 1785 | 12.125 | 141 | 1800 | 8.6 | 15 |

TABLE 1-continued

| | | Nose damper | | Tire | | | |
|---|---|---|---|---|---|---|---|
| | Tire size | Cross section shape | Circumferential length L1 (mm) | Section area S2 (cm$^2$) | Cavity section area S (cm$^2$) | Circumferential length Lc (mm) | Ratio S2/S (%) | Spacing "g" (mm) |
| g | 195/40R17 | B | 1705 | 12.125 | 109 | 1720 | 11.1 | 15 |
| | 205/40R17 | B | 1705 | 12.125 | 123 | 1726 | 9.9 | 21 |
| h | 245/40R20 | C | 2055 | 13.5 | 181 | 2070 | 7.5 | 15 |
| | 245/45R19 | C | 2055 | 13.5 | 202 | 2085 | 6.7 | 30 |
| i | 255/45R18 | C | 2010 | 13.5 | 217 | 2023 | 6.2 | 13 |
| | 235/50R18 | C | 2010 | 13.5 | 207 | 2045 | 6.5 | 35 |
| j | 245/35R20 | C | 1990 | 13.5 | 160 | 2010 | 8.4 | 20 |
| | 255/35R20 | C | 1990 | 13.5 | 173 | 2020 | 7.8 | 30 |
| k | 285/30R20 | C | 1970 | 13.5 | 189 | 1985 | 7.1 | 15 |
| | 275/35R19 | C | 1970 | 13.5 | 200 | 1985 | 6.8 | 15 |
| | 275/40R18 | C | 1970 | 13.5 | 224 | 1989 | 6.0 | 19 |
| | 245/45R18 | C | 1970 | 13.5 | 202 | 1993 | 6.7 | 23 |
| l | 275/30R20 | C | 1950 | 13.5 | 176 | 1980 | 7.7 | 30 |
| | 235/50R17 | C | 1950 | 13.5 | 207 | 1973 | 6.5 | 23 |
| | 245/40R19 | C | 1950 | 13.5 | 181 | 1976 | 7.5 | 26 |
| m | 225/45R18 | C | 1920 | 13.5 | 172 | 1950 | 7.8 | 30 |
| | 225/50R17 | C | 1920 | 13.5 | 191 | 1945 | 7.1 | 25 |
| | 235/45R18 | C | 1920 | 13.5 | 187 | 1956 | 7.2 | 36 |
| n | 245/35R19 | C | 1900 | 13.5 | 160 | 1920 | 8.4 | 20 |
| | 245/40R18 | C | 1900 | 13.5 | 181 | 1921 | 7.5 | 21 |
| | 245/45R17 | C | 1900 | 13.5 | 202 | 1926 | 6.7 | 26 |
| o | 235/40R18 | C | 1875 | 13.5 | 166 | 1893 | 8.1 | 18 |
| | 235/45R17 | C | 1875 | 13.5 | 187 | 1895 | 7.2 | 20 |
| | 275/30R19 | C | 1875 | 13.5 | 176 | 1890 | 7.7 | 15 |
| | 265/35R18 | C | 1875 | 13.5 | 187 | 1900 | 7.2 | 25 |
| | 275/35R18 | C | 1875 | 13.5 | 200 | 1907 | 6.8 | 32 |
| | 265/40R17 | C | 1875 | 13.5 | 210 | 1900 | 6.4 | 25 |
| p | 225/45R17 | C | 1850 | 13.5 | 172 | 1877 | 7.8 | 27 |
| | 265/30R19 | C | 1850 | 13.5 | 164 | 1880 | 8.2 | 30 |
| | 255/35R18 | C | 1850 | 13.5 | 173 | 1815 | 7.8 | 15 |
| | 255/40R17 | C | 1850 | 13.5 | 195 | 1968 | 6.9 | 17 |
| q | 235/40R17 | C | 1805 | 13.5 | 166 | 1820 | 8.1 | 15 |
| | 245/45R17 | C | 1805 | 13.5 | 181 | 1835 | 7.5 | 30 |
| r | 195/45R16 | E | 1690 | 12.15 | 126 | 1702 | 9.6 | 12 |
| | 185/55R15 | E | 1690 | 12.15 | 142 | 1715 | 8.6 | 25 |
| | 205/50R15 | E | 1690 | 12.15 | 159 | 1724 | 7.6 | 34 |
| s | 195/60R14 | E | 1720 | 12.15 | 176 | 1732 | 6.9 | 12 |
| | 195/55R15 | E | 1720 | 12.15 | 159 | 1740 | 7.6 | 20 |
| | 205/45R16 | E | 1720 | 12.15 | 141 | 1727 | 8.6 | 7 |
| t | 195/60R15 | E | 1800 | 12.15 | 176 | 1808 | 6.9 | 8 |
| | 195/55R16 | E | 1800 | 12.15 | 159 | 1817 | 7.6 | 17 |
| u | 205/60R15 | E | 1830 | 12.15 | 194 | 1845 | 6.3 | 15 |
| | 205/55R16 | E | 1830 | 12.15 | 177 | 1754 | 6.9 | 24 |
| v | 165/45R16 | D | 1580 | 9.75 | 80 | 1609 | 12.2 | 29 |
| | 165/50R15 | D | 1580 | 9.75 | 94 | 1594 | 10.4 | 14 |
| w | 165/60R14 | D | 1615 | 9.75 | 123 | 1625 | 7.9 | 10 |
| | 165/55R15 | D | 1615 | 9.75 | 108 | 1645 | 9.0 | 30 |

Although a particularly preferable embodiment of the present invention has been described, the present invention is not limited to only such an embodiment as illustrated in the drawings, and various changes and modifications may be made.

Practical Test 1

Noise dampers comprising a spongy material having a cross sectional shape shown in Table 2 were fixed to four kinds of tires having tire sizes of 215/60R16, 225/60R16, 215/45R17 and 245/45R18, and the noise suppression performance thereof was tested. An ether-based polyurethane sponge having a specific gravity of 0.039 made by Inoac Corporation (product number ESH2) was used as a spongy material for noise damper, and the spongy material was adhered to the tire inner surface along the tire equator by one round with a pressure sensitive adhesive double-coated tape made by Ebisu Chemical Co., Ltd. (product number E700). The fixing portion of the tire inner surface was buffed to remove a releasing agent on the inner surface.

<Noise Suppression Performance>

Figure 8:
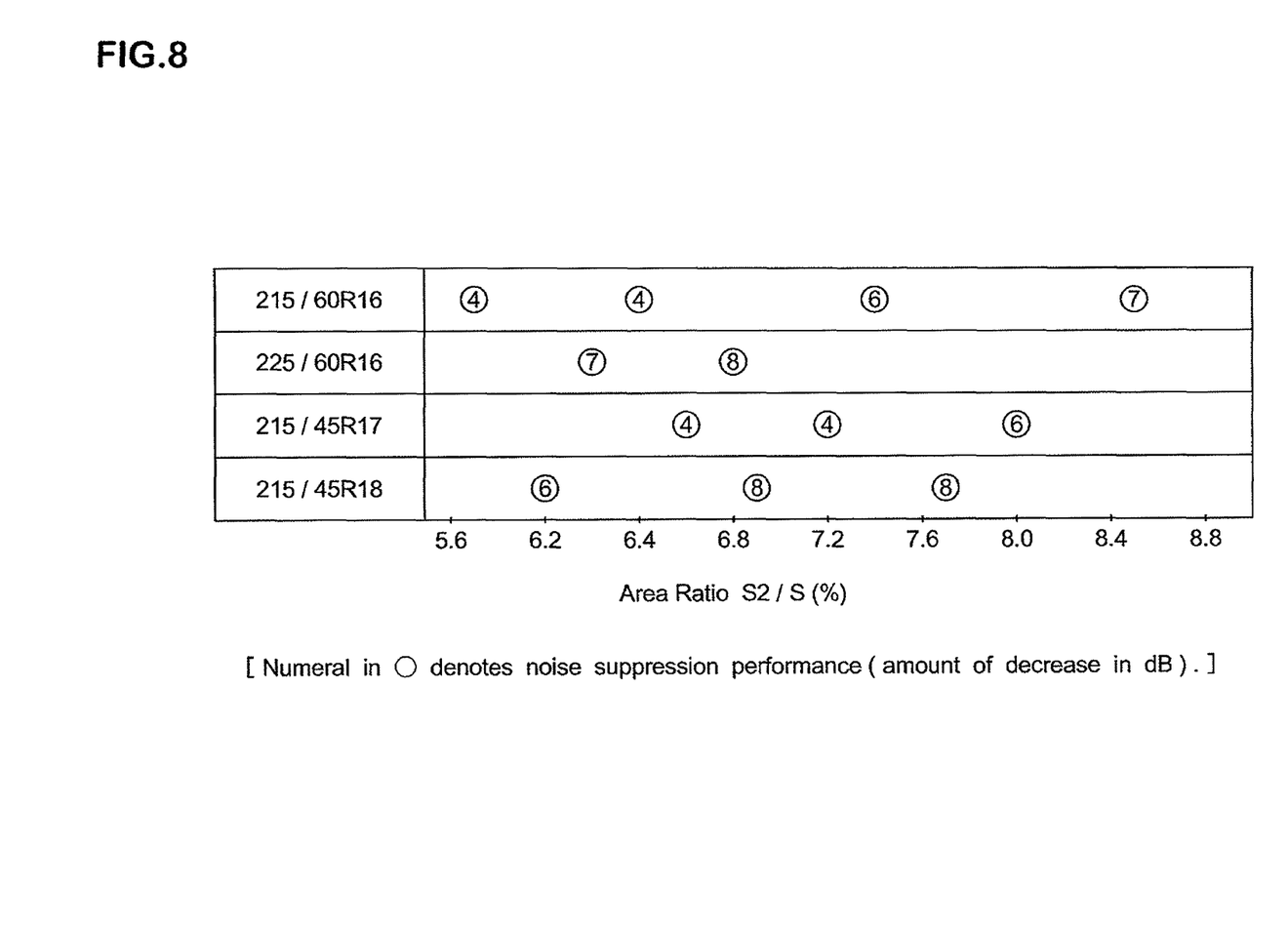
FIG. 8 is a view showing a relationship between the ratio S2/S and the noise suppression performance.

Pneumatic tires with noise damper were mounted on normal rims and inflated to a normal inner pressure (200 kPa). Tires of 215/60R16 were attached to all wheels of vehicle 1 (2,400 cc FF vehicle made in Japan), tires of 225/60R16 were attached to all wheels of vehicle 2 (4,000 cc FR vehicle made in Japan), tires of 215/45R17 were attached to all wheels of vehicle 3 (2,500 cc FR vehicle made in Japan), and tires of 245/45R18 were attached to all wheels of vehicle 4 (4,000 cc FR vehicle made in Japan). The vehicles 1 to 4 were made to run at 60 km/h on a road noise measuring road (asphalt rough surface road), and a noise in the vehicles was collected by a microphone at an ear position on a driver's seat on the window side. A sound pressure level of a peak value of a columnar resonance in the vicinity of narrow-band 230 Hz was measured. The result is indicated as a value of reduction of the sound pressure level based on a tire having no noise damper with respect to each tire size. Here, "−" (minus sign) means that the road noise is reduced. Further, in FIG. 8 is shown a relationship between the noise suppression performance and the ratio S2/S of the sectional area S2 of the noise dampers and the cavity sectional area S of the tires.

TABLE 2

| | Noise damper W2 × T2 | Ratio S2/S (%) | Sectional shape | Noise suppression performance (dB) |
|---|---|---|---|---|
| 215/60R16 | 90 × 20 | 8.5 |  | −7 |
| | 90 × 20 | 7.4 |  | −6 |
| | 90 × 20 | 6.4 |  | −4 |
| | 97 × 20 | 5.7 |  | −4 |
| 225/60R16 | 125 × 20 | 6.8 |  | −8 |
| | 97 × 20 | 6.3 |  | −7 |
| 215/45R17 | 100 × 20 | 8.0 |  | −6 |
| | 90 × 20 | 7.2 |  | −4 |
| | 83 × 20 | 6.6 |  | −4 |
| 245/45R18 | 125 × 20 | 7.7 |  | −8 |
| | 111 × 20 | 6.9 |  | −8 |
| | 100 × 20 | 6.2 |  | −6 |

It can be confirmed that an effect of noise reduction of 4 dB or more that a driver can strongly feel road noise reduction is obtained when the area ratio S2/S is within a range of 5.7% or more, although the effect varies to some extent depending on the cross sectional shape of the noise damper, the tire size, the type of vehicle and the like.

Practical Test 2

Figure 6A:
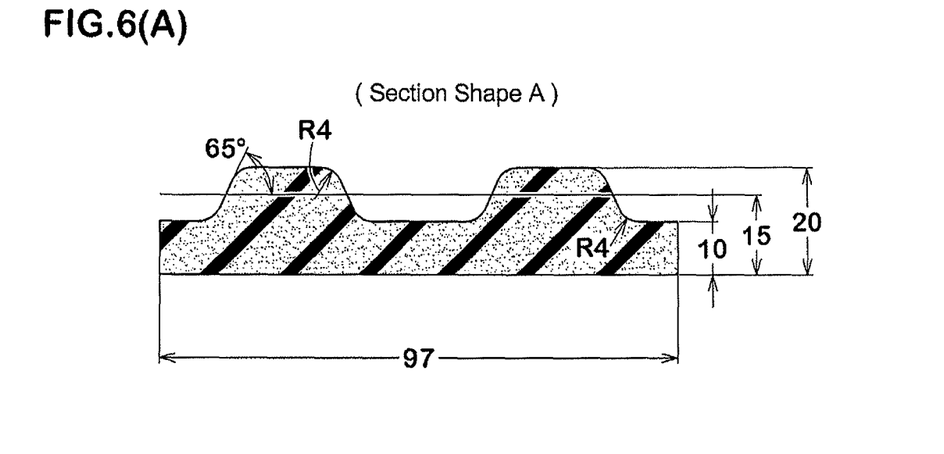
FIGS. 6(A) to 6(C) are cross sectional views showing cross sectional shapes of noise dampers used in tire sets shown in Table 1.
Figure 6B:
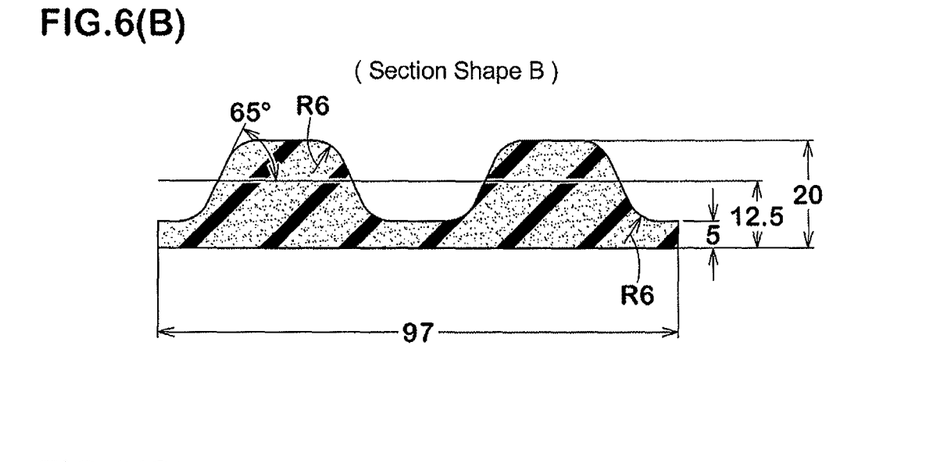
Figure 6C:
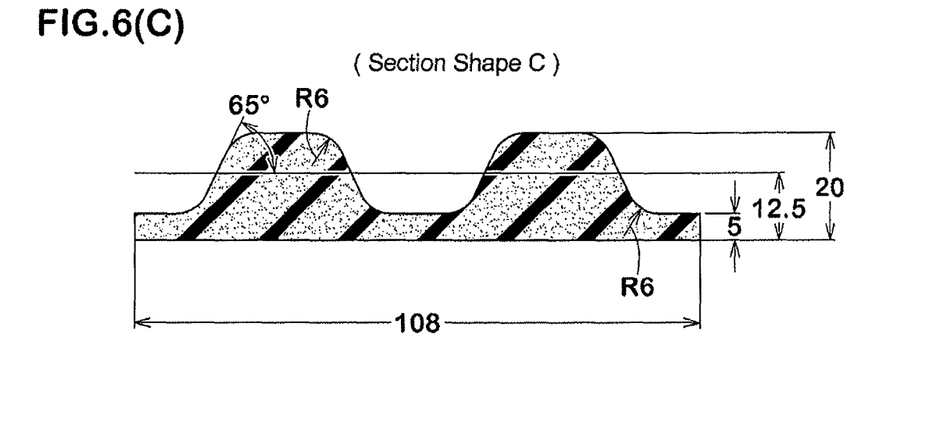
Figure 7A:
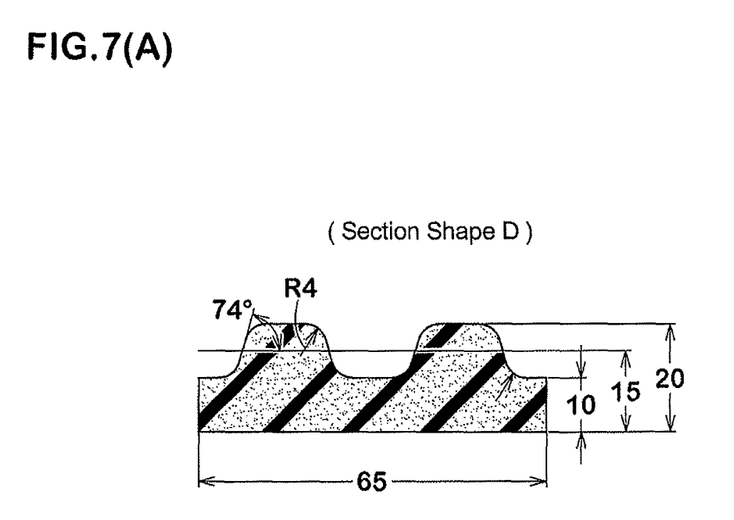
FIGS. 7(A) and 7(B) are cross sectional views showing cross sectional shapes of noise dampers used in tire sets shown in Table 1.
Figure 7B:
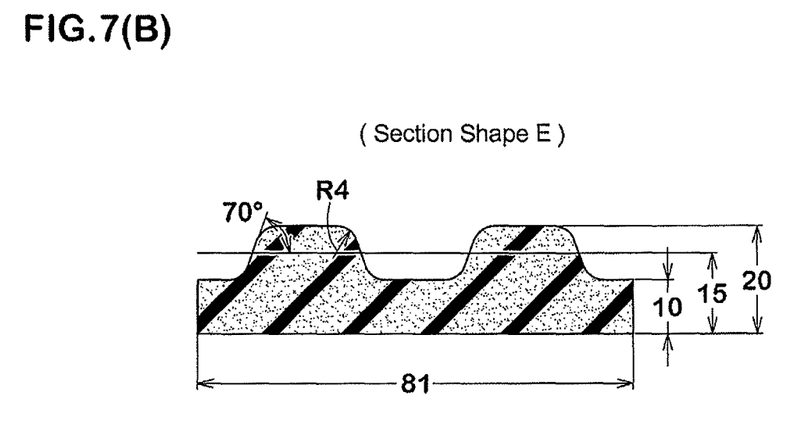

Noise dampers comprising a spongy material having a B-type cross sectional shape shown in FIG. 6(B) were fixed to tires having tire sizes of 195/40R17 and 215/60R16, and the noise suppression performance and the durability were tested. The materials and the like of the spongy material and the pressure sensitive adhesive double-coated tape are the same as those in Practical Test 1

<Noise Suppression Performance>

The test was made in the same manner as the noise suppression performance test in Practical Test 1 except that tires of 195/40R17 were attached to a vehicle 5 (1,800 cc FF vehicle made in Japan), and tires of 215/60R16 were attached to a vehicle 6 (2,500 cc FR vehicle made in Japan).

<Durability>

A pneumatic tire with noise damper was mounted on a normal rim and inflated to a normal inner pressure (200 kPa). The tire was made to run 12,000 km on a drum (diameter: 1.7 m) under a vertical load of 1.2 times the maximum value prescribed in JATMA at a running speed of 80 km/hour, and presence or absence of damages of the noise damper was checked.

TABLE 3

| | Example 1 | Example 2 |
|---|---|---|
| Noise damper | | |
| Cross sectional shape | B | B |
| Circumferential length L1 (mm) | 1705 | 1980 |
| Cross sectional area S2 (cm$^2$) | 12.125 | 12.125 |
| Tire | | |
| Size | 195/40R17 | 215/60R16 |
| Cavity sectional area S (cm$^2$) | 109 | 212 |
| Circumferential length Lc (mm) | 1720 | 1980 |
| Ratio S2/S | 11.1 | 5.7 |
| Spacing "g" (mm) | 15 | 15 |
| Noise suppression performance (dB) | −10 | −5 |
| Durability | No damage | No damage |

It can be confirmed that there is no bad influence on the durability, at least when the S2/S ratio is 11.1% or less.

What is claimed is:

1. A pneumatic tire set comprising pneumatic tires to be attached to a rim, and noise dampers made of a spongy material which are fixed to an inner surface of the tires facing a tire cavity surrounded by the rim and the pneumatic tire and which extend in the circumferential direction of the tire, wherein each pneumatic tire in the pneumatic tire set has a single one of said noise dampers, each of the noise having the same cross-sectional shape and size and having a cross-sectional area S2 of 5.7 to 11.1% of a cavity cross-sectional area S of the tire cavity, the pneumatic tires having at least two different tire sizes in a size group of pneumatic tires including a minimum volume tire such that the cavity cross-sectional area S of the tire cavity on the meridian cross-section including a tire shaft has a minimum value Smin and a maximum volume tire such that the cavity cross-sectional area S has a maximum value Smax, and the pneumatic tires having sizes such that the cavity sectional area ratio Smax/Smin falls within the range of greater than 1.00 to 1.95.

2. The pneumatic tire set of claim 1, wherein the noise dampers are fixed to the inner surface of the tires along the tire equator in the circumferential direction, and the spacing between the circumferential both ends of each noise damper is at most 80 mm.

3. The pneumatic tire set of claim 2, wherein the size group includes a circumferential length group of tires in which the difference in circumferential length of the inner surface of the tires on the tire equator is at most 80 mm, and the noise dampers in this circumferential length group of tires having the same circumferential length.

4. The pneumatic tire set of claim 3, wherein the size group of pneumatic tires is any one of the following size groups a to w:

a) 225/60R16, 225/55R17
b) 215/60R16, 215/55R17
c) 215/45R18, 235/35R19, 215/50R17
d) 225/40R18, 205/50R17, 215/35R19, 225/50R16
e) 215/40R18, 215/45R17
f) 225/35R18, 205/45R17
g) 195/40R17, 205/40R17
h) 245/40R20, 245/45R19 i) 255/45R18, 235/50R18
j) 245/35R20, 255/35R20
k) 285/30R20, 275/35R19, 275/40R18, 245/45R18
l) 275/30R20, 235/50R17, 245/40R19
m) 225/45R18, 225/50R17, 235/45R18
n) 245/35R19, 245/40R18, 245/45R17
o) 235/40R18, 235/45R17, 275/30R19, 265/35R18, 275/35R18, 265/40R17
p) 225/45R17, 265/30R19, 225/35R18, 255/40R17
q) 235/40R17, 245/40R17
r) 195/45R16, 185/55R15, 205/50R15
s) 195/60R14, 195/55R15, 205/45R16
t) 195/60R15, 195/55R16
u) 205/60R15, 205/55R16
v) 165/45R16, 165/50R15
w) 165/60R14, 165/55R15.

\* \* \* \* \*